United States Patent [19]

Nametz et al.

[11] 4,141,880
[45] Feb. 27, 1979

[54] FLAME RETARDED NYLON COMPOSITION

[75] Inventors: Richard C. Nametz, Manchester; Peter H. Burleigh, Ann Arbor, both of Mich.

[73] Assignee: Velsicol Chemical Corporation, Chicago, Ill.

[21] Appl. No.: 866,323

[22] Filed: Jan. 3, 1978

[51] Int. Cl.² .................... B60S 9/22; C08L 77/00
[52] U.S. Cl. ........................ 260/37 N; 260/857 R; 528/212
[58] Field of Search .................... 260/857 R, 37 N

[56] References Cited

U.S. PATENT DOCUMENTS

| 3,431,238 | 3/1969 | Borman | 260/857 R |
| 4,072,658 | 2/1978 | Okamoto | 260/857 R |

FOREIGN PATENT DOCUMENTS 47-20243  9/1972  Japan .................... 260/857 R

Primary Examiner—Paul Lieberman
Attorney, Agent, or Firm—Robert M. Phipps; Howard J. Greenwald

[57] ABSTRACT

Disclosed is a novel, flame retarded, non-blooming nylon composition with excellent thermal stability. This composition is comprised of from about 5 to about 35 percent (by weight) of a condensation product derived from brominated phenol by the displacement of bromine from said phenol wherein: (a) said phenol is selected from the group consisting of tribromophenol, tetrabromophenol, pentabromophenol, and mixtures thereof; (b) said condensation product has a repeating structural unit of the formula

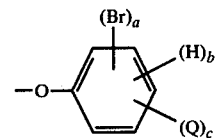

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus, and the polymeric units containing said repeating structural unit comprise at least 80 percent (by weight) of said product; (c) said condensation product contains from about 17 to about 31 percent (by weight) of elemental carbon, from about 0 to about 1.0 percent (by weight) of elemental hydrogen, from about 3 to about 8 percent (by weight) of elemental oxygen, and at least 60 percent (by weight) of elemental bromine; and (d) said condensation product has a molecular weight of at least 750, and one or more polymeric units containing at least four aromatic nuclei per unit comprise at least about 80 percent (by weight) of said product.

25 Claims, No Drawings

FLAME RETARDED NYLON COMPOSITION

FIELD OF THE INVENTION

A flame-retarded nylon composition comprised of from about 5 to about 35 percent (by weight) of a condensation product derived from a brominated phenol is disclosed. This composition does not bloom, exhibits excellent thermal stability, and has good physical properties.

DESCRIPTION OF THE PRIOR ART

Nylons are strong, tough thermoplastic materials having good impact, tensile, and flexural strengths from freezing temperatures up to about 300 degrees Fahrenheit; they also possess excellent low-friction properties and good electrical resistivities.

The word "nylon" is a generic term for any long-chain synthetic polymeric amide which has recurring amide groups as an integral part of the main polymer chain.

Certain nylons are identified by the number of carbon atoms in the diamine and dibasic acid used to produce them; thus, e.g., nylon 6/6 is a polymer produced by the condensation of hexamethylene diamine and adipic acid. Some nylons are produced by the condensation of only one reactive species, and they are generally produced from an amino acid or a lactam. These latter class of nylons are usually identified by the number of carbon atoms in the monomer used to produce them; thus, e.g., poly(aminocaproic acid) is produced by the polymerization of caprolactam, and it is referred to as "nylon 6".

Some common nylons which are commercially available are nylons 6/6, 6/9, 6/10, 6/12, 6, 8, 9, 11, and 12. Nylons 6 and 6/6 are the strongest structurally. Nylons 6/10 and 11 have excellent dimensional stability, electrical, and moisture absorption properties. Nylons 6/6, 6, and 8 are heat-sealable; and nylon 8 is capable of cross linking.

Nylon's unique properties have made it one of the most commercially important synthetic condensation polymers. Nylon fibers, for example, are stronger than any of the natural fibers, have resistance to abrasion at least four times as great as that of wool, have good flexibility properties, and are unaffected by solvents normally used in dry cleaning. Injection-molded nylon, for example, is extensively used to produce bearings and gears; it is uniquely suited for this use because it has better mechanical properties and abrasion resistance than other thermoplastics and better chemical resistance and lower dry friction than many common dry metals.

There are several flammability standards which have been promulgated by the Underwriter's Laboratory in Chicago, Illinois; and many thermoplastic articles must meet these standards for certain applications. Notwithstanding its unique properties, nylon cannot be used in these articles unless they possess the requisite degree of inflammability. Unfortunately, it is difficult to flame retard nylon (or, for that matter, any thermoplastic) without adversely affecting its physical properties.

It is virtually impossible to accurately predict whether any particular composition will impart commerically useful flame retardancy to nylon when admixed therewith. This is so because it is not known exactly what occurs during the pyrolysis of "virgin" nylon polymer and/or the pyrolysis of the nylon polymer to which the flame retardant has been added. To compound the confusion, it is not known by what mechanism—or mechanisms—flame retardancy occurs.

In a book edited by Jolles, entitled "Bromine and Its Compounds" (Academic Press, New York, 1966), this confusion is evident. At pages 664–666, the editor admits that there is a "... lack of fundamental knowledge concerning the characteristics of uninhibited flames and mechanism of flame inhibition." He mentions that the "current theory" of flame inhibition, proposed by Rosser and his co-workers, "... postulates that the active atoms and radicals (H, OH, O, etc.) responsible for flame propagation are removed, probably by HBr, with the production of less reactive species." However, he also notes research done by Creitz regarding the effectiveness of methyl bromide and bromotrifluoromethane as inhibitors of diffusion flame systems when these agents are introduced to either the fuel or oxygen side of the flame. Creitz found that methyl bromide and bromotrifluoromethane were more effective inhibitors when added to the oxygen side of a hydrogen or hydrocarbon diffusion flame than when added to the fuel side. Creitz suggested that, since the decomposition products of the extinguishing agent were not effective inhibitors, inhibition might occur as a result of (1) some particular property of the inhibitor molecule, (2) reaction of the inhibitor molecule itself with fuel decomposition products, or (3) further reaction of the newly-formed decomposition product to yield other, and effective materials. The editor states that "participation of the intact inhibitor molecule in the inhibition reaction is contrary to the Rosser mechanism which involves the termination of chain reactions by halogen atoms ..."

Many writers have suggested that several mechanisms may occur simultaneously during flame inhibition. Thus, e.g., in a book by Mascia entitled "The Role of Additives in Plastics" (Halstead Press Division of John Wiley & Sons, New York, 1974), the author states that "four possibilities are available for promoting fire retardancy in plastics ... (1) Coating the exposed area of reduce oxygen permeation, hence decreasing the rate of oxidative reactions ... (2) Forming large amounts of incombustible gases which would dilute the oxygen supply and reduce the rate of combustion ... (3) Promoting endothermic reactions in the exposed regions in order to reduce the temperature below that which would sustain ignition ... (4) inhibiting the free-radical oxidation process so that the rate of formulation of very active OH* radicals is reduced ... Most flame retardant agents exert their action by more than one of the mechanisms previously described .... " (at pp. 161–164)

If, in fact, Rosser's postulate is correct, and hydrogen bromide generated during pyrolysis of the polymer "removes" active radicals, then one might expect that the addition of an active free radical source to a polymeric system comprised of a flame-retarding halogen-containing compound might increase that system's flammability; for, presumably, the free radicals generated from the active free radical source would compete with the "active radicals" generated during pyrolysis for hydrogen bromide, fewer of these "active radicals" would be removed during pyrolysis, and the higher concentration of these "active radicals" (which allegedly promote flame propagation) should increase flammability. Surprisingly, this effect does not occur in polystyrene. According to an article published by J. Eichhorn entitled "Synergism of Free Radical Initiators with Self-Extingusihing Additives in Vinyl Aromatic Polymers" in the Journal of Applied Polymer Science, Vol. 8, pp. 2497-2524 (1964), the amount of halogen needed to make vinyl aromatic polymers nonflammable can be greatly reduced by the addition of small amounts of free radical initiator. It appears that, at least in some polymeric systems, the Rosser postulate cannot satisfactorily account for the phenomena which occur.

A prospective flame retardant must be thermally stable so that, during the processing of the polymer into which it is incorporated, a substantial amount of it is not lost from the system. If Rosser's postulate is correct, however, it cannot be too stable; for, presumably, if it does not release hydrogen halide during pyrolysis of the polymer it will not flame retard. Furthermore, the incorporation of any additive into a polymer system may alter the products of pyrolysis, the rate at which energy is conducted back into the solid from the flame front, the diffusion rate of pyrolysis products to the surface, the burning rate, or the decomposition temperature of the system. Even if the temperature at which the unmodified polymer matrix pyrolyzes is substantially above the temperature at which a prospective flame retardant releases hydrogen halide, it is possible that the admixture of the two will yield a composition with properties modified in such a manner that, during pyrolysis, hydrogen halide is not released and the flame is not inhibited.

The art which relates to flame retarding nylon is somewhat confusing. However, there are disclosures that the incorporation of halogen-containing compounds into nylon increases rather than decreases its flammability. Thus, e.g., it is disclosed that ". . . the burning process which occurs in nylon is not as well understood as it is for some substrates such as cotton . . . . Apparently, random bond-breaking rather than depolymerization is occurring up to around 370° C. Stepniczka (1973), as well as Strauss and Wall (1958) have concluded that early pyrolysis studies, notably those of Straus and Wall, are not consistent with a purely homolytic cleavage reaction . . . . " K. B. Gilleo, "Industrial Engineering and Chemistry, Product Research and Development", Vol. 13, No. 2, pp. 139 et seq. (1974). This writer presents data indicating that the oxygen indices for nylon 6 compositions comprised of six percent of organobromine compounds are lower than those for "virgin" nylon 6 (which contains no flame retardant). He concludes that ". . . the addition of phosphorous compound to nylon often lowers the OI value and increases overall flammability . . . . Halogen compounds, capable of forming HX, on pyrolysis, also decrease OI values."

A similar phenomenon was reported by T. J. Reardon and R. H. Barker on pp. 1903-1917 of the Journal of Applied Polymer Science, Vol. 18 (1974). The authors admit that ". . . there is no clear understanding of the pyrolysis of nylon 6. Although several investigators . . . have studied the thermal decomposition of polyamides, the different experimental procedures and instrumentation used have resulted in many conflicting decomposition mechanisms . . . . " The authors discuss the results of research they had done upon the effects that some highly brominated organic compounds had upon nylon pyrolysis. They state that caprolactam is the main product of the thermal decomposition of nylon 6 (and remains the main product of decomposition even when the nylon 6 compositions are mixed with the brominated flame retardants studied), that a condensed phase reaction takes place between nylon 6 and these organobromine flame retardants, and that these flame retardants lower the activation energy of the nylon 6 system and decrease its decomposition temperature. They conclude that ". . . simple organobromine compounds are not good candidates for utilization as flame retardants for nylon 6."

Thus, those skilled in the nylon flame retarding art are taught that, e.g., they should not attempt to use many commercially available organobromine compounds to flame retard nylon. This makes their quest for a flame retarded nylon difficult; and this difficulty is compounded by the fact that the composition they seek must not only flame retard nylon but also must not adversely affect nylon's physical properties to too great a degree or cause the nylon composition to bloom.

In order to be commercially useful, a prospective flame retardant composition must neither volatilize out of the polymer matrix during processing nor exude to the surface after the polymer matrix has been extruded. Thus, e.g., the composition cannot aggregate by precipitating or crystallizing out of the polymer matrix upon aging; if it does, "chalking" occurs, and it leaves behind a fine film of additive deposits. Thus, e.g., the composition should not be extractable by liquids with which the host polymeric composition may come into contact during finishing operations, and it must not exude out during the use of the extruded polymeric material; these two phenomena are known as "bleeding" and "blooming", respectively. Bleeding and blooming have several very adverse effects: they produce aesthetically objectionable effects, they contaminate liquids and other products in contact with the polymeric component, and they decrease the concentration of the composition in the polymer.

There does not appear to be much literature which attempts to describe the mechanism(s) of blooming. It is suspected that this is so because blooming is an enigmatic and unpredictable phenomenon.

In most plastics, a high concentration of an additive in the plastic increases the likelihood of blooming occurring. However, in polyvinyl chloride compositions, blooming is more likely to occur at the low additive concentrations. See, e.g., pp. 133-134 of "Vinyl and Allied Polymers, Vol. 2 (CRC Press, Cleveland, Ohio, 1971).

Blooming will occur if the additive is not "compatible" with the polymer matrix. Thus, e.g., the prior art discloses that "bleeding and blooming phenomena are obviously related to the kinetics of diffusion and consequently are dependent upon parameters such as compatibility of the additive with the polymer, molecular size of the additive, physico-chemical interactions between additive and polymer molecules, configuration of polymer chains and intermolecular voids etc." Masica, "The Role of Additives in Plastics", op cit., p. 6.

The "Encyclopedia of Polymer Science and Technology", Vol. 2 (Interscience, New York, 1965) teaches that "bloom is a visible exudation (or efflorescence) caused by lubricant, plasticizer, etc. on the surface of a polymer (1). It is usually the result of incompatibility of the additive with the polymer or of exclusion of additive or low-molecular-weight polymer upon the onset of crystallization of the polymer." (at p. 531)

If the theory that incompatibility of an additive with the polymer matrix causes blooming is correct, then it would help explain why so many fire retardant additives bloom in thermoplastic systems: very few of them are truly compatible with the polymer matrices. In an article appearing at pages III-211 to III-213 of the "Polymer Handbook", Second Edition (John Wiley & Sons, New York, 1975), L. Bohn states that "compatability . . . will refer to the miscibility on an intimate polymer scale of polymers in the solid state. Such miscibility will only take place if the Gibbs free energy of mixing . . . is negative. The entropy term . . . is unsignificant in the mixing of high molecular weight species. The enthalphy of mixing . . . is normally positive to such an extent as to overcompensate for the entropy term, resulting generally in an unfavorable energy of mixing for polymer blends. Real compatability is therefore a rare event, especially in the solid state."

Polyphenylene oxide compositions possess excellent flammability properties, generally being self-extinguishing. However, because they are generally polymeric in nature, those skilled in the art do not appear to have attempted to utilize them to produce flame-retarded, non-blooming thermoplastics comprised of a minor portion of polyphenylene oxide. These polyphenylene oxides are extensively described in the literature. See, e.g., Nippon Kagaku Kaishi, 1976 (10), pp. 1608–1614 (polymerization of sodium 2,4,6-tribromophenolate in the presence of dimethyl sulfoxide), Journal of the American Chemical Society, 1960 (82), pp. 3632–3634 (polymerization of the silver salt of 2,4,6-tribromophenol by iodine), Bulletin of the Chemical Society of Japan, 1962 (35), pp. 1958–1965 (reaction of benzoyl peroxide with various substituted phenols), British Pat. No. 999,134 issued July 21, 1965 (preparation of various halogenated phenylene oxide polymers by heating metal 4-halogenophenoxides in a ketone solvent), U.S. Pat. No. 3,361,851 (blend of a polyolefin and a polyphenylene oxide), U.S. Pat. No. 3,379,792 (blend of polyphenylene oxide and from 0.1 to 25 percent of a polyamide), U.S. Pat. No. 3,383,435 (blend of a polyphenylene ether and a styrene resin), U.S. Pat. No. 3,639,499 (blend of a high melting hydrocarbon resin and polyphenylene ether), U.S. Pat. No. 3,639,506 (which discloses that ". . . the admixture of a polyphenylene ether with a styrene resin destroys the flame retardancy of the polyphenylene ethers"), U.S. Pat. No. 3,660,531 (blends of polyphenylene oxide with butadiene homopolymers and copolymers), etc. There are many other prior art references, both domestic and foreign, which describe polyphenylene oxide compositions.

Applicant has discovered that, notwithstanding the teachings of the prior art that it should increase the flammability of nylon and bloom when incorporated into nylon, the use of a certain brominated poly(phenylene oxide) in nylon unexpectedly gives one a unique nylon composition which has good flammability properties, does not bloom, and possesses excellent thermal stability.

SUMMARY OF THE INVENTION

In accordance with this invention, there is provided a flame retarded, non-blooming nylon composition comprised of from about 5 to about 35 percent (by weight) of a condensation product derived from brominated phenol by the displacement of bromine from said phenol, wherein (a) said phenol is selected from the group consisting of tribromophenol, tetrabromophenol, pentabromophenol, and mixtures thereof; (b) said condensation product has a repeating structural unit of the formula

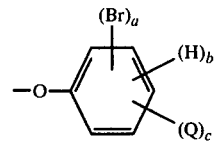

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus, and the polymeric units containing said repeating structural unit comprise at least 80 percent (by weight) of said product; (c) said condensation product contains from about 17 to about 31 percent (by weight) of elemental carbon, from about 0 to about 1.0 percent (by weight) of elemental hydrogen, from about 3 to about 8 percent (by weight) of elemental oxygen, and at least 60 percent (by weight) of elemental bromine; and (d) said condensation product has a molecular weight of at least 750, and one or more polymeric units containing at least four aromatic nuclei per unit comprise at least about 80 percent (by weight) of said product.

PREFERRED EMBODIMENTS

The thermal stability of the composition of this invention is unexpectedly excellent. When the condensation product described above is incorporated into, e.g., polyester, the resulting composition has a thermal stability which is mediocre to poor. However, when this condensation product is incorporated into nylon, the resulting composition exhibits an excellent thermal stability.

The physical properties of the composition of this invention are substantially better than most of the flame retarded nylon compositions which are now commercially available. The flame retardant which is now most widely used in nylon is Dechlorane 515 ®, a polychlorinated cycloaliphatic compound sold by the Hooker Chemical Corporation of Niagara Falls, New York. The tensile strengths and Izod impact strengths of the nylon compositions of this invention are substantially greater than those of comparable nylon compositions comprised of Dechlorane 515 ®.

The condensation product has a repeating structural unit of the formula

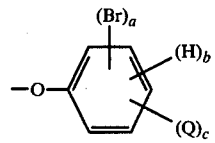

wherein a is an integer of from about 0 to about 4, b is an integer of from about 0 to about 2, c is an integer of from about 1 to about 5, a plus b plus c equal 5, and Q is a monovalent bond from a carbon atom in the aromatic nucleus of said repeating structural unit to an oxygen atom bonded to an aromatic nucleus. This monovalent bond may exist any place on the aromatic nuclei in the composition wherein there was a carbon-bromine bond; it is formed by the displacement of bromine. Thus, for example, it may exist in a position para to the oxygen-carbon bond. One repeating structural unit which has this para bond may be represented by the formula

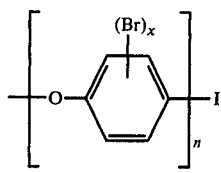

wherein x is 1, 2, 3, or 4 (and preferrably is 2 or 3); this repeating unit forms linear chains. Thus, in other instances where c is 1, the monovalent bond may exist at the ortho position (structure II).

Thus, the bond may exist at both the ortho and para positions when c is 2 (structure "III"); and it may exist ortho, ortho, and para to the carbon-oxygen bond when c is 3 (structure IV).

The condensation product may contain other repeating structural units containing monovalent bonds formed by the displacement of bromine. Said monovalent bonds may exist on some of the repeating units on both ortho positions, the ortho and meta positions, the para and meta positions, the para and both meta positions, the ortho and both meta positions, both ortho and one or both meta positions, the ortho and meta and para positions, etc.

The flame retarding condensation product used in the nylon composition of this invention contains at least one of the repeating structural units denoted I, II, III, and IV. At least about 80 percent (by weight) of this product is comprised of polymer chains containing one or more of these units.

The flame retarding composition is a condensation product of a brominated phenol selected from the group consisting of tribromophenol, tetrabromophenol, pentabromophenol, and mixtures thereof. It is preferred that the brominated phenol be selected from the group consisting of tribromophenol and tetrabromophenol; it is most preferred that the brominated phenol be tribromophenol.

The flame retarding condensation product used in this invention has a molecular weight of at least about 750, and one or more polymeric units containing at least four aromatic nuclei per unit comprise at least about 80 percent (by weight) of the product. The molecular weight of the product is determined in accordance with the vapor phase osmometry method specified by test A.S.T.M. D2503-67.

The flame retarding condensation product contains from about 17 to 31 percent (by weight) of carbon, from about 0 to about 1.0 percent (by weight) of elemental hydrogen, from about 3 to about 8 percent (by weight) of elemental oxygen, and at least about 60 percent (by weight) of elemental bromine. It is preferred that said condensation product contain from about 62 to about 66 percent (by weight) of elemental bromine.

It is preferred that the flame retarding condensation product used in the nylon composition of this invention have a notched Izod impact strength of less than about 0.5 foot-pounds per inch (A.S.T.M. D256), and an elongation of less than about 2.0 percent and a tensile strength of less than about 200 pounds per square inch (A.S.T.M. D638).

In one of the preferred embodiments, the flame retarding condensation product contains less than about 200 aromatic nuclei and has an intrinsic viscosity (in tetrahydrofuran at 25° centigrade) of less than about 1.8.

The flame retarding condensation product may be prepared by any of several methods well known to those skilled in the art. Generally, the brominated phenol is contacted with an effective amount of activating agent and allowed to condense for a period of up to about 48 hours at a temperature of up to about 450° centigrade. Suitable activating agents include, without limitation, heat, light, organic and inorganic peroxides such as benzoyl peroxide, hydrogen peroxide, dimethane sulfonyl peroxide, lauroyl peroxide, caprylyl peroxide, succinic peroxide, acetyl peroxide, p-tertiary-butyl benzoyl peroxide, tertiary-butylperoxy isopropyl carbonate peroxide, hydroxyheptyl peroxide, cyclohexane peroxide, 2,5-dimethylhexane-2,5-di(peroxybenzoate) peroxide, tertiary-butyl peracetate peroxide, di-tertiary-butyl diperphthalate peroxide, tertiary butyl perbenzoate peroxide, and the like; azo compounds, such as azobisisobutyronitrile, for example; persulfates, such as ammonium persulfate, potassium persulfate, and sodium persulfate; hypochlorites; ferricyanides; ferric chloride; metal oxides, such as lead oxide, mercury oxide, silver oxide, and the like; halogen, such as iodine, bromine, and chlorine; lead tetracetate; sodium bismuthate; etc. Generally, any of the activators known to promote free radical chain initiation may be used.

Alternatively, one may use a metal salt of the brominated phenol with the activating agents. Suitable salts which may be utilized include, without limitation, the lithium, sodium, potassium, rubidium, cesium, magnesium, calcium, strontium, barium, zinc, and tin salts of the brominated phenol. Other phenolates well known to those skilled in the art may also be used.

The brominated phenol (or the metallic salt derived from it) may be contacted with the activating agent in the solid state. Alternatively, one may conduct the polymerization of the brominated phenol (or its salt) in a suitable solvent. Any of the solvents well known to those skilled in the art may be used; they include, without limitation, water, dimethylsulfoxide, acetone, hexane, methanol, ethanol, propanol, butanol, benzene, toluene, tetrahydrofuran, etc. Aqueous salt solutions wherein the salt is selected from the group consisting of barium chloride, calcium chloride, magnesium chloride, strontium chloride, potassium chloride, lithium chloride, sodium chloride, and the like may also be utilized. Mixtures of organic solvents and water may be used; thus aqueous acetone solutions, benzene and water, aqueous alkaline solution and organic compounds insoluble in water (such as octyl alcohol, toluene, and heptane), carbon tetrachloride and water, amyl alcohol and water, and the like are suitable. Other suitable solvents well known to the art include camphor, paraffin, sulfur dioxide, aniline, aniline and water, benzoic acid and water, hexane and water, isopentane, methylcyclohexane and water, methyl pentane and water, naphthalene and water, octane, piperdine and water, pyridine and water, triethylamine and water and the like. In general, any of the aqueous or organic solvents in which phenol or its salt are known to be soluble may be used to prepare the flame retarding condensation product.

One of many methods which may be used to prepare the condensation product involves dissolving a metal hydroxide in water and, to the solution thus formed, adding activating agent and the brominated phenol; thereafter, the reaction mixture is maintained at a specified temperature.

In this method, an emulsifying agent which is capable of dispersing the brominated phenol in the hydroxide solution so that the average particle size (diameter) of the phenol molecules will be from about 1 micron to to about 1.0 millimeter may be used. Thus, for example, dodecyl sodium sulfate may be used. When an emulsifying agent is used, from about 0.1 to about 5.0 percent of it (by weight of the water in the hydroxide solution) should be present in the reaction mixture. The emulsifying agent may be added prior to, simultaneously with, or subsequent to the addition of the brominated phenol to the reaction mixture.

In this method, an alkali or alkaline earth metal hydroxide may be used. It is preferred to use a metal hydroxide selected from the group consisting of sodium hydroxide, potassium hydroxide, and lithium hydroxide; sodium hydroxide is the most preferred. From about 0.5 to about 5.0 moles of the hydroxide per liter of water is utilized. It is preferred to use from about 1 to about 3 moles of hydroxide per liter of water; it is most preferred to use about 2 moles of the hydroxide per liter of water.

The brominated phenol described hereinabove is added to the reaction mixture at a concentration of from about 0.5 to about 5 moles per liter of water to make up the hydroxide solution in this method. It is preferred to use from about 1 to about 3 moles of phenol per liter of water. It is most preferred that the concentration be about 2 moles of phenol per liter of water.

In this method, although it is not essential, organic solvent may be added to the reaction mixture; any of the organic solvents listed hereinabove may be utilized. When organic solvent is used, it is preferred that from 1 to about 20 parts of it (by volume of water used to make up the hydroxide solution) be utilized. It is more preferred to use from about 3 to about 10 percent of organic solvent in this process; and it is most preferred to use from about 4 to about 8 percent of organic solvent. Some of the preferred organic solvents include toluene, benzene, chloroform, chlorinated benzenes, and the like.

Activating agent is contacted with the reaction mixture after all of the other components are present in this process. When the activating agent is solid, liquid, or gaseous, at least about $1 \times 10^{-5}$ moles of it (based upon the amount of water used to make up the hydroxide solution) is used; it is preferred to use from about 0.01 to about 0.1 moles of these activating agents.

After the activating agent has been contacted with the reaction mixture, the reaction mixture is maintained at a temperature of from about 20° to about 180° centigrade for from about 5 to about 300 minutes in this process. It is preferred to maintain the reaction mixture at a temperature of from about 20 to about 100 degrees centigrade for from about 15 to about 120 minutes. It is most preferred to maintain the reaction mixture at a temperature of from about 45° to about 65° centigrade for from about 20 to about 40 minutes.

In this process, it is preferred that the reaction be run at a pressure of from about 1.0 to about 20 atmospheres. It is more preferred to use a pressure of about 1.0 atmosphere during the reaction.

The flame retarded nylon composition of this invention contains from about 5 to about 35 percent (by weight) of the flame retarding condensation product referred to hereinabove. It is preferred that it contain from about 9 to about 22 percent (by weight) of said flame retarding condensation product.

The flame retarded nylon composition of this invention may also contain enhancing agents which, when used with said condensation product, promote a cooperative effect therebetween and thus enhance the flame retardancy of the resultant nylon composition as compared to the flame retardancy of nylon compositions containing either component alone. Those skilled in the art are familiar with these enhancing agents.

Some of the enhancing agents well known to those skilled in the art include the oxides and halides of the metals of groups IVA and VA of the Periodic Table such as the oxides and halides of antimony, bismuth, arsenic, tin, lead, and germanium; antimony oxychloride, antimony chloride, antimony oxide, stannic oxide, stannic chloride, arsenous oxide, arsenous chloride, and the like are enhancing agents well known to the art. Other enhancing agents well known to those skilled in the art are the organic and inorganic compounds of phosphorous, nitrogen, boron, and sulfur; thus, e.g., triphenyl phosphate, ammonium phosphate, zinc borate, thiourea, urea, stannic sulfide, and the like are suitable enhancing agents. The oxides and halides of titanium, vanadium, chromium, magnesium are also used as enhancing agents as are the hydrates of these compounds; thus, e.g., titanium dioxide, titanium chloride, vanadium pentoxide, chromic bromide, manganous oxide, molybdenum trioxide, ammonium molybdate, stannous oxide hydrate, lead hydrate, and combinations thereof may be used. Many antimony compounds, both organic and inorganic, are useful as enhancing agents; antimony sulfide, sodium antimonite, potassium antimonite, antimony butyrate, antimony valerate, antimony caproate, antimony heptylate, antimony caprylate, antimony pelargonate, antimony caprate, antimony cinnamate, antimony anisate, tris(n-octyl) antimonite, tris(2-ethylhexyl)antimonite, tribenzyl antimonite, trimethylolpropane antimonite, pentaerythritol antimonite, glycerol antimonite, and compounds which on decomposition (as by ignition) yield antimony oxide are well known to the art as enhancing agents.

The preferred enhancing agents are the oxides of antimony, arsenic, and bismuth. The more preferred enhancing agents are the oxides of antimony. The most preferred enhancing agent is antimony trioxide.

When enhancing agent is incorporated into the flame retarded nylon composition of this invention, from 1 to about 20 percent of it (by weight of the combined nylon, flame retardant, and enhancing agent) may be used. It is preferred to utilize from about 3 to about 10 percent (by weight) of enhancing agent.

It is also within the scope of the present invention to employ other materials in the nylon compositions of the invention where one so desires to achieve a particular end result. Such materials include, without limitation, adhesion promotors; antioxidants; antistatic agents; antimicrobial agents; colorants; other flame retardants (in addition to the flame retarding condensation product described herein); heat stabilizers; light stabilizers; fillers; reinforcing agents; and other mterials well known to those skilled in the art which have been or could be used with nylon compositions and which are described, e.g., in Modern Plastics Encyclopedia, Vol. 52, No. 10A, McGraw-Hill, Inc., New York, New York (1975). Said encyclopedia is hereby incorporated in toto by reference into this disclosure.

The above described materials which may be employed in the nylon compositions of this invention can be utilized in any amounts which will not substantially adversely affect the properties of these compositions. Thus, the amount used can be zero (0) percent, based on the total weight of the composition, up to that percent at which the composition can still be classified as a plastic. In general, such amount will be from about 0% to about 80%.

All modified nylons which are comprised of from about 5 to about 35 percent (by weight) of the flame retarding condensation product described hereinabove are within the scope of this invention. Thus, e.g., the modified nylons described in pages 410 et seq. of Nylon Plastics, John Wiley & Sons, New York, New York (1973) are within the scope of this invention if they are comprised of from about 5 to about 35 percent of said condensation product. Thus, without limitation, a nylon which is comprised of from about 5 to about 35 percent (by weight) of said flame retarding condensation product and which has a modified physical form (such as granules that are nominally cylindrical or rectangular with sides, lengths, or diameters of from about 0.06 to about 0.12 inches, powders with diameters of from about 10 to about 100 microns, and microcystalline nylons with diameters of from about 50 to about 100 angstroms), a nylon with modified chemical structure created by the copolymerization techniques known to the art, a nylon with modified physical structure caused by the addition of colorants and processing modifiers (such as pigments and dyes, external lubricants, mold release agents, nucleating agents, viscosity thickeners, blowing agents, plasticizers, fillers and reinforcing agents, lubricity aids, antistatic aids, and the like), and a nylon with modified chemical structure caused by the use of chemical property modifiers (such as antioxidant systems, stabilizers, fire retardants other than those described in the specification, etc.) are all comprehended within this invention if they contain from about 5 to about 35 percent (by weight) of said condensation product.

Glass reinforced nylon comprised of from about 6 to about 60 percent (by weight) of fiberglass and the nylon composition of this invention is within the scope of this invention. The glass fibers used to make this composition may be treated with coupling agents well known to those skilled in the art so that the nylon will bond strongly to the surface of the glass. The glass reinforced nylon composites of this invention have excellent water absorption, dimensional stability, mold shrinkage, and creep resistance properties.

Asbestos reinforced nylon compositions comprised of from about 6 to about 60 percent (by weight) of asbestos and the flame retarded nylon composition of this invention are also comprehended by this invention.

Polymer blends of the nylon composition of this invention with other plastic compositions are within the scope of this invention. They include, without limitation, blends with nylon which is not comprised of the condensation product described herein, melt blends with incompatible hydrocarbon polymers such as polyethylene, blends with ethylene/alkyl acrylate ester copolymers, blends with ethylene/unsaturated carboxylic acid copolymers, and the like. They also include compositions created by grafting the polymers onto the nylon composition described herein, block copolymers, and, in general, all of the combinations and permutations known to those skilled in the art. It is preferred that the nylon blend compositions of this invention be comprised of at least 25 percent (by weight) of the flame retarded nylon composition described hereinabove.

Many other applications for and modifications of the flame retarded nylon compositions of this invention will suggest themselves to those skilled in the art; they are intended to be comprehended within the scope of this invention.

The following examples are provided for the purpose of further illustration only and are not intended to be limitations on the invention disclosed. Unless otherwise specified, all parts are by weight, all weights are in grams, all temperatures are in degrees centigrade, and all volumes are in milliliters.

PREPARATION OF THE FLAME RETARDING CONDENSATION PRODUCTS

EXAMPLE I

Two hundred milliliters of chloroform were added to a one liter, three-necked, round-bottomed flask fitted with mechanical stirring, addition funnel, reflux condenser, and nitrogen flush. Sixteen and one-half grams of 2,4,6-tribromophenol were added to the chloroform. Thereafter, 2.8 grams of potassium hydroxide were dissolved in 100 milliliters of water, and this solution was then added to the reaction mixture. An aqueous solution of potassium ferricyanide was prepared; 1.6 grams of the potassium ferricyanide were dissolved in 100 milliliters of water. This solution was added over a period of one hour to the reaction mixture. Thereafter, the reaction mixture was maintained at ambient temperature and stirred for 4.5 hours. Then the reaction mixture was poured into a separatory funnel. The bottom chloroform phase was dropped directly into vigorously stirred methanol. The white precipitate which formed was filtered and dried. This product softened at a temperature of from about 220° to about 240° centigrade. It had an intrinsic viscosity (in chloroform, at 26 degrees centigrade) of 0.050 deciliters per gram.

EXAMPLE II

To a one liter, three-necked, round bottom flask fitted with mechanical stirring, reflux condenser, and nitrogen flush were added 100 milliliters of 1,2,4-trichlorobenzene. Thereafter, 58.7 grams of pentrabromophenol were added with stirring; and then 2.9 grams of benzoyl peroxide were added to the reaction mixture. A solution of potassium hydroxide (6.8 grams of KOH in 100 milliliters of water) was prepared; and this solution was quickly added to the reaction mixture. Two milliliters of dimethyl sulfoxide and four milliliters of dimethyl formamide were then added to the reaction mixture, causing a mild exotherm. Stirring was continued at ambient temperature for 5 hours. The reaction mixture was then poured into a separatory funnel. The 1,2,4-trichlorobenzene layer (bottom) was then dropped directly into vigorously stirred acetone. The precipitated product was dissolved in 100 milliliters of tetrahydrofuran and reprecipitated in 450 milliliters of acetone. The product had a softening point of about 290° centigrade.

EXAMPLES III-IV

These experiments were conducted in substantial accordance with the procedure described in Example I, but different catalysts and/or different brominated phenols (or mixtures thereof) were used. The results of these experiments are shown in Table I. In Examples III and IV, 2,4,6-tribromophenol was utilized as the reactant. Examples V and VI utilized pentabromophenol.

TABLE I

| EXAMPLE NUMBER | CATALYST (10 MOLE %) | POLYMER YIELD (%) | SOFTENING POINT (° C.) | INTRINSIC VISCOSITY (25° C., chloroform, deciliters/gram) |
|---|---|---|---|---|
| III | K$_3$Fe(CN)$_6$ | 80 | 240–260 | 0.050 |
| IV | BENZOYL PEROXIDE | 100 | 225–250 | 0.050 |
| V | K$_3$Fe(CN)$_6$ | 10 | 290 | 0.0 |
| VI | BENZOYL PEROXIDE | 86 | 290 | 0.0 |

EXAMPLES VII and VIII

The procedure described in Example I was substantially followed with the exception that equimolar amounts of 2,4,6-tribromophenol and pentabromophenol were utilized as the reactant. In Example VII, potassium ferricyanide was utilized as the catalyst (10 mole %); a 12 percent yield of a product with a softening point of from about 210° to about 220° centigrade was obtained. In Example VIII, benzoyl peroxide was utilized as a catalyst (10 mole %); a 98 percent yield of a product with a softening point of 250° centigrade and an intrinsic viscosity (at 25° centigrade in chloroform) of 0.032 deciliters per gram was obtained.

EXAMPLE IX

Two thousand milliliters of water, 164 grams of sodium hydroxide, 10.7 grams of "Emulsifier 334" (an aryl polyether emulsifier sold by the Milliken Chemical Corporation), 0.7 grams of dodecyl sodium sulfate, and 1324 grams of 2,4,6-tribromophenol were charged to a five-liter flask fitted with mechanical stirring, a thermometer, and a reflux condenser. The reaction mixture was first heated to 100° centigrade and maintained at that temperature for one minute; then it was cooled to a temperature of 33° centigrade. To this mixture was charged 133 milliliters of toluene and 20 grams of benzoyl peroxide. An exothermic reaction occurred, and the reaction temperature was then maintained at 55° centigrade for 0.5 hours. Thereafter, 25 grams of sodium hydroxide were added to the reaction mixture. The reaction mixture was then filtered, the filter cake was washed with 15 liters of water, and the filter cake was dried to give 932 grams of product.

FLAME RETARDED NYLON COMPOSITIONS

Zytel ® nylon 6,6 chip obtained from the E. I. Dupont Company was dried for 17 hours at a temperature of 79° centigrade. Thereafter it was used in Examples X, XI, and XII.

EXAMPLE X (Comparative)

Three hundred grams of the dried nylon chip, 240 grams of Dechlorane 515 ® (a polychlorinated cycloaliphatic flame retardant sold by the Hooker Chemical Corporation, and 60 grams of antimony trioxide were dry-mixed and compounded in a high shear C.W. Brabender mixer (model R6) for one minute at a temperature of 224° centigrade. Thereafter, the "concenrate" so prepared was mixed with an additional 600 grams of the nylon chip of Example X, and the mixture so formed was fed into a Newbury HI-30RS 30 ton injection molding machine with compounding mixer. A stock temperature of 475° fahrenheit was used, and test specimens were prepared.

The specimens contained 20.0 percent (by weight) of Dechlorane 515 ® and 5.0 percent of antimony trioxide. They were tested for various properties in accordance with the following test procedures:

| PROPERTY TESTED | ASTM TEST METHOD | NO. SAMPLES TESTED FOR RESULTS |
|---|---|---|
| Yield Tensile Strength (p.s.i.) | D 638 | 5 |
| Elongation to Fracture, % | D 638 | 5 |
| Unannealed Heat Deflection Temperature, ° F. | D 648 | 4 |
| Izod Impact (unnotched) foot-pounds/inch | D 256 | 6 |

The samples were also tested for flammability in accordance with Underwriter's Laboratory Subject No. 94 test (UL Tests for Flammability of Plastic Materials, UL 94, February 1, 1974). Self-extinguishing properties were measured using this test which is carried out on test specimens 6 × ½ × ⅛". In this test, the test specimen was supported from the upper end, with the longest dimension vertical, by a clamp on a ring stand so that the lower end of the specimen was ⅜" above the top of the burner tube. The burner was then placed remote from the sample, ignited, and adjusted to produce a blue flame ¾" in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of three specimens with 6 flame applications) should exceed 25 seconds (maximum not more than 30 seconds) and the portion of the specimen outside the clamp should not be completely burned in the test.

Materials which complied with the above requirements and did not drip any flaming particles or droplets during the burning test were classified as "V-1". Materials which complied with the above requirement but dripped flaming particles or droplets which burned briefly during the test were classified as "V-2". A "V-0" rating was given to materials wherein the duration of flaming or glowing combustion averaged less than 5 seconds under the conditions specified above.

For each of the aforementioned tests, several samples were tested, and the average of the test results for any one test was compiled.

The nylon specimens of Example X had the following properties:

| | |
|---|---|
| Izod Impact (unnotched), Ft/lb per inch | 1.03 |
| U.L. 94 1/8" rating | V1 |
| U.L 94 1/16" rating | V2 |
| Unannealed heat distortion temperature, ° F. | 210 |
| Yield tenseile strength, p.s.i. | 4420 |
| Elongation to fracture, % | 2 |

EXAMPLE XI (Comparative)

In substantial accordance with the procedure described in Example X, test specimens comprised of 22.0 percent Dechlorane 515 ® and 5.5 percent of antimony trioxide were prepared. Two hundred and seventy grams of Zytel ® nylon 6,6, 264 grams of Dechlorane 515 ®, and 66 grams of antimony trioxide were used to prepare the "concentrate". Thereafter, the concentrate was mixed with 600 grams of the Zytel ® nylon 6,6 chip. The compounding and injection molding conditions used were the same as those in Example XI.

The injection molded nylon specimens had the following properties:

| | |
|---|---|
| Izod impact (unnotched), ft/lb. per inch | 1.05 |
| U.L. 94 1/8" rating | V-0 |
| U.L. 94 1/16" rating | V-0 |
| Unannealed heat distortion temperature, ° F. | 256 |
| Yield tensile strength, p.s.i. | 5030 |
| Elongation to fracture, % | 3 |

EXAMPLE XII

In substantial accordance with the procedure described in Example X, test specimens comprised of 18.0 percent of the product of Example IX and 3.6 percent of antimony trioxide were prepared. Two hundred and sixteen grams of the product of Example IX, 340.8 grams of the Zytel ® nylon 6,6 chip of Example X, and 43.2 grams of antimony trioxide were used to form the "concentrate" in accordance with the procedure of Example XI. Thereafter, 600 additional grams of the nylon 6,6 of Example X were mixed with the concentrate and injection molded into test specimens in accordance with said procedure at a stock temperature of 480° fahrenheit.

These specimens were tested in accordance with the procedures described in Example X. Furthermore, they were also tested for migration ("blooming") by being subjected to a temperature of 100° centigrade for 100 hours and then being visually observed to determine whether any flame retardant migrated to the surface.

The nylon composition of this invention and this Example had the following properties:

| | |
|---|---|
| Izod impact (unnotched), foot/pound/inch | 4.28 |
| U.L. 94 1/8" rating | V-0 |
| U.L. 94 1/16" rating | V-2 |
| Unannealed heat distortion temperature, ° F. | 184.1 |
| Yield tensile strength, p.s.i. | 8190 |
| Elongation to fracture, % | 5 |
| Migration (100 hours at 100° C.) | none |

EXAMPLE XIII

In substantial accordance with the procedure described in Example X, 54.0 grams of product prepared in substantial accordance with the procedure of Example IX, 10.8 grams of antimony trioxide, and 235.2 grams of nylon 6,6 were dry blended; and test specimens were prepared by injection molding. These test specimens did not exhibit any migration after having been subjected to a temperature of 100° degrees centigrade for 100 hours, had a U.L. 94⅛" rating of V-0 and a U.L. 94 1/16" rating of V-2, had an unannealed heat distortion temperature of 175° farhenheit, and had a tensile strength of 7,700 p.s.i., an elongation of 4 percent, and an Izod Impact (unnotched) of 5.7 foot-pounds/inch.

Unlike many prior art flame-retarded nylon compositions, the composition of this invention exhibits good thermal stability, good heat distortion temperature, excellent tensile strength and Izod impact strength, and very good migration resistance.

EXAMPLES XIV-XVIII

In substantial accordance with the procedures described in Examples X and XI, the properties of nylon 6 samples which contained no flame retardant (Example XIV) or varying amounts of the flame retardant product made in accordance with the procedure of Example IX and antimony trioxide (Examples XV to XVIII) were determined. The results obtained are shown in the following table. The amounts of flame retardant and antimony trioxide used are shown as percents; they reflect the percents (by weight) of these components based upon the total weight of the nylon compositions. The heat distortion temperature measurement was made upon unannealed samples and is expressed in degrees fahrenheit. The Izod impact measurement is expressed in foot-pounds/inch; in accordance with ASTM D256, a standard notch was cut on the narrow faces of the specimens tested.

| Example | Percent Flame Retardant | Percent Antimony Trioxide | U.L. 94 Test ⅛" | Heat Distortion Temperature | Izod Impact |
|---|---|---|---|---|---|
| XIV | 0 | 0 | HB | 121 | 4.15 |
| XV | 12 | 4 | V-2 | 127 | 1.89 |
| XVI | 15 | 5 | V-0 | 136 | 2.64 |
| XVII | 18 | 3.6 | V-0 | 131 | 2.55 |
| XVIII | 18 | 0 | HB | 139 | 2.14 |

EXAMPLES XIX-XXIII

Nylon 6,9 which was filled with about 80 percent of ferric oxide (by weight of the total composition) was formulated into test specimens in accordance with the procedures described in Examples XV-XVIII; these test specimens were comprised of varying amounts of the flame retardant prepared in accordance with the procedure of Example IX and antimony trioxide. The U.L. 94 test was conducted on ⅛" samples. The heat distortion test was conducted on samples which had been annealed at a temperature of 100° fahrenheit for one hour; the results of this test are expressed in degrees fahrenheit. The Izod impact test was conducted on notched samples. The results obtained are presented below.

| Ex. | Percent Flame Retardant | Percent Antimony Trioxide | U.L. 94 Rating (⅛") | Heat Distortion Temperature | Izod Impact |
|---|---|---|---|---|---|
| XIX | 0 | 0 | V-2 | 137.8 | 1.61 |

-continued

| Ex. | Percent Flame Retardant | Percent Antimony Trioxide | U.L. 94 Rating (⅛") | Heat Distortion Temperature | Izod Impact |
|---|---|---|---|---|---|
| XX | 15 | 5 | V-0 | 143.1 | 1.39 |
| XXI | 18 | 6 | V-0 | 149.2 | 1.38 |
| XXII | 20 | 4 | V-0 | 142.5 | 1.38 |
| XXIII | 20 | 0 | V-0 | 134.2 | 1.42 |

When nylon 6 and nylon 6,6 samples which are filled with fiberglass and are comprised of the flame retardant product of Example IX are tested for flammability, heat distortion temperature, and Izod impact, similarly good results are obtained.

The embodiments of the invention in which an exclusive property or privilege is claimed are defined as follows:

1. A flame retarded, non-blooming nylon composition which is comprised of from about 5 to about 35 percent (by weight) of a polyphenylene oxide condensation product derived from brominated phenol by the displacement of bromine from said phenol wherein: (a) said phenol is selected from the group consisting of tribromophenol, tetrabromophenol, pentabromophenol, and mixtures thereof; (b) said condensation product has a repeating structural unit of the formula

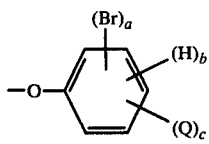

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus, and the polymeric unit(s) containing said repeating structural unit comprise at least about 80 percent (by weight) of said product; (c) said condensation product contains from about 17 to about 31 percent (by weight) of elemental carbon, from about 0 to about 1.0 percent (by weight) of elemental hydrogen, from about 3 to about 8 percent (by weight) of elemental oxygen, and at least 60 percent (by weight) of elemental bromine; and (d) said condensation product has a molecular weight of at least 750, and one or more polymeric units containing at least four aromatic nuclei per unit comprise at least about 80 percent (by weight) of said product.

2. The nylon composition of claim 1, wherein said brominated phenol is selected from the group consisting of tribromphenol, tetrabromophenol, and mixtures thereof.

3. The nylon composition of claim 2, wherein a is at least 1.

4. The nylon composition of claim 3, wherein c is selected from the group consisting of 1, 2, 3, and mixtures thereof.

5. The nylon composition of claim 4, wherein said brominated phenol is tribromphenol; and wherein said condensation product contains from about 62 to about 66 percent of elemental bromine.

6. The nylon composition of claim 5, wherein said brominated phenol is 2,4,6-tribromophenol; wherein said nylon compositions is comprised of from about 9 to about 22 percent (by weight of composition) of said condensation product; and wherein said condensation product has a notched Izod impact strength of less than about 0.5 foot pounds per inch (A.S.T.M. D 256), and an elongation of less than about 2.0 percent and a tensile strength of less than about 200 pounds per square inch (A.S.T.M. D 638).

7. The nylon composition of claim 6, wherein said condensation product has an intrinsic viscosity (in tetrahydrofuran at 25° centigrade) of less than about 1.8.

8. A flame retarded, non-blooming nylon composition which is comprised of from about 1 to about 20 percent (by weight) of enhancing agent and from about 5 to about 35 percent (by weight) of a polyphenylene oxide condensation product derived from brominated phenol by the displacement of bromine from said phenol wherein: (a) said phenol is selected from the group consisting of tribromophenol, tetrabromophenol, pentabromophenol, and mixtures thereof; (b) said condensation product has a repreating structural unit of the formula

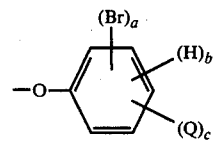

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus, and the polymeric unit(s) containing said repeating structural unit comprise at least about 80 percent (by weight) of said product; (c) said condensation product contains from about 17 to about 31 percent (by weight) of elemental carbon, from about 0 to about 1.0 percent (by weight) of elemental hydrogen, from about 3 to about 8 percent (by weight) of elemental oxygen, and at least 60 percent (by weight) of elemental bromine; and (d) said condensation product has a molecular weight of at least 750, and one or more polymeric units containing at least four aromatic nuclei per unit comprise at least about 80 percent (by weight) of said product.

9. The nylon composition of claim 8, wherein said enhancing agent is selected from the group consisting of oxides of antimony, arsenic, and bismuth.

10. The nylon composition of claim 9, wherein said nylon composition is comprised of from about 3 to about 10 percent (by weight) of said enhancing agent and from about 9 to about 22 percent (by weight) of said condensation product.

11. The nylon composition of claim 10, wherein said enhancing agent is antimony trioxide.

12. The nylon composition of claim 11, wherein said brominated phenol is selected from the group consisting of tribromophenol, tetrabromphenol, and mixtures thereof.

13. The nylon composition of claim 12, wherein a is at least 1.

14. The nylon composition of claim 13, wherein c is selected from the group consisting of 1,2,3 and mixtures thereof.

15. The nylon composition of claim 14, wherein said brominated phenol is tribromphenol; and wherein said condensation product contains from about 62 to about 66 percent (by weight) of elemental bromine.

16. The nylon composition of claim 15, wherein said brominated phenol is 2,4,6-tribromophenol; and wherein said condensation product has a notched Izod impact strength of less than about 0.5 foot pounds per inch (A.S.T.M. D 256), and an elongation of less than about 2.0 percent and a tensile strength of less than about 200 pounds per square inch.

17. The nylon composition of claim 1, wherein said composition is comprised of from about 0 to about 80 percent (by weight) of a material selected from the group consisting of adhesion promotors, antioxidants, antistatic agents, antimicrobial agents, colorants, other flame retardants (in addition to the flame retarding condensation product described herein), heat stabilizers, light stabilizers, fillers, reinforcing agents, and mixtures thereof.

18. The nylon composition of claim 8, wherein said composition is comprised of from about 0 to about 80 percent (by weight) of a material selected from the group consisting of adhesion promoters, antioxidants, antistatic agents, antimicrobial agents, colorants, other flame retardants (in addition to the flame retarding condensation product described herein), heat stabilizers, light stabilizers, fillers, reinforcing agents, and mixtures thereof.

19. The nylon composition of claim 1, wherein said composition is comprised of from about 6 to about 60 percent (by weight) of fiberglass and at least 20 percent (by weight) of said nylon composition.

20. The nylon composition of claim 8, wherein said composition is comprised of from about 6 to about 60 percent (by weight) of fiberglass and at least 20 per percent (by weight) of said nylon composition.

21. The nylon composition of claim 1, wherein said composition is comprised of from about 6 to about 60 percent (by weight) of asbestos and at least 20 percent (by weight) of said nylon composition.

22. The nylon composition of claim 8, wherein said composition is comprised of from about 6 to about 60 percent (by weight) of asbestos and at least 20 percent (by weight) of said nylon composition.

23. A polymer blend comprised of at least 25 percent (by weight) of the nylon composition of claim 1.

24. A polymer blend comprised of at least about 25 percent (by weight) of the nylon composition of claim 8.

* * * * *